US008160848B2

(12) United States Patent
Watanabe et al.

(10) Patent No.: US 8,160,848 B2
(45) Date of Patent: Apr. 17, 2012

(54) APPARATUS FOR GENERATING COARSE-GRAINED SIMULATION IMAGE OF SAMPLE TO BE MEASURED WITH A PROBE OF A SCANNING PROBE MICROSCOPE (75) Inventors: Naoki Watanabe, Tokyo (JP); Masaru Tsukada, Tokyo (JP); Katsunori Tagami, Tokyo (JP)

(73) Assignees: Mizuho Information & Research Institute, Inc., Chiyoda-ku, Tokyo (JP); Waseda University, Shinjuku-ku, Tokyo (JP)

( * ) Notice: Subject to any disclaimer, the term of this patent is extended or adjusted under 35 U.S.C. 154(b) by 425 days.

(21) Appl. No.: 12/440,714

(22) PCT Filed: Mar. 29, 2007

(86) PCT No.: PCT/JP2007/057612
§ 371 (c)(1),
(2), (4) Date: Mar. 10, 2009

(87) PCT Pub. No.: WO2008/035473
PCT Pub. Date: Mar. 27, 2008

(65) Prior Publication Data
US 2010/0042378 A1 Feb. 18, 2010

(30) Foreign Application Priority Data
Sep. 21, 2006 (JP) .................................. 2006-256169

(51) Int. Cl.
G06G 7/48 (2006.01)
G06G 7/56 (2006.01)
G01Q 10/00 (2010.01)
G01Q 10/02 (2010.01)

(52) U.S. Cl. .................................... 703/5; 850/1; 850/2

(58) Field of Classification Search .................. 702/103, 702/127, 155, 158, 162, 166, 167, 168; 850/1, 850/2; 703/1, 5; 382/128; 250/128; 73/104, 73/105
See application file for complete search history.

(56) References Cited

U.S. PATENT DOCUMENTS
5,376,790 A * 12/1994 Linker et al. ..................... 850/2
5,898,176 A 4/1999 Mori et al.

FOREIGN PATENT DOCUMENTS
| EP | 223918 A2 | 6/1987 |
| JP | 06-117844 A | 4/1994 |
| JP | 07-174769 A | 7/1995 |
| JP | 08-035831 A | 2/1996 |
| JP | 08-178935 A | 7/1996 |
| JP | 2004-279349 A | 10/2004 |

OTHER PUBLICATIONS

Villarrubia, J.S., "Algorithms for Scanned Probe Microscope Image Simulation, Surface Reconstruction, and Tip Estimation", Jul.-Aug. 1997, Journal of Research of the National Institute of Standards and Technology.* Ogata, Susumu, et al., "Molecular Dynamics Simulation for Analysis of Surface Morphology of Lubricant Films with Functional End Groups", Oct. 2005, IEEE Transactions on Magnetics, vol. 41, No. 10.*

* cited by examiner

Primary Examiner — Paul Rodriguez
Assistant Examiner — Cedric D Johnson
(74) Attorney, Agent, or Firm — Marsh Fischmann & Breyfogle LLP (57) ABSTRACT A sample atomic configuration creation part in a control section creates the atomic arrangement data of a sample, and a sample surface height calculation part calculates a sample surface height for every mesh. A probe profile creation part creates the atomic arrangement data of a probe, and a probe surface height calculation part calculates the height of the probe surface for every mesh. A probe scanning part supplies the coordinate of a scanning start position in the scanning range to a collision height specification part. The collision height specification part calculates the distance between the sample surface and the probe in each mesh. Calculation of this distance is repeated for all meshes of the probe at the coordinate of this measuring position.

11 Claims, 10 Drawing Sheets

APPARATUS FOR GENERATING COARSE-GRAINED SIMULATION IMAGE OF SAMPLE TO BE MEASURED WITH A PROBE OF A SCANNING PROBE MICROSCOPE

TECHNICAL FIELD

The present invention relates to a simulation apparatus, a simulation method, and a simulation program for generating a simulation image from a measurement result of a scanning probe microscope.

BACKGROUND ART

A scanning probe microscope (SPM) is used to measure the detailed shape and properties of a sample surface. Examples of a scanning probe microscope includes a scanning tunneling microscope (STM) and an atomic force microscope (AFM). The STM measures physical phenomena, such as current (tunneling current), by arranging a sharp tip of a probe near a sample (specimen) and measuring the shape and properties of the sample surface at the atomic level. The AFM enables observation of an insulating sample, which is difficult to measure with the STM, with an accuracy equivalent to the size of an atom (refer to, for example, Patent Document 1). By using the scanning probe microscope, the state of molecules adsorbed on the surface of a known object can also be evaluated.

The resolution and stability of a scanning probe microscope is greatly affected by the tip of a probe. The tip of a probe is required to be sharp at the atomic level, and an atom at the probe tip is required to be stable. Many techniques have been developed to manufacture a desirable probe (refer to, for example, Patent Documents 2 and 3).

However, it is normally difficult to manufacture a sharp probe at the atomic level. Even if such a probe can be manufactured, a scanning probe microscope using such a probe may fail to form a measurement image that corresponds to the atomic structure of a sample surface not only due to interactions between the atom forming the tip of the probe and the measurement subject but also due to interactions between other atoms of the probe and the measurement subject.

Numerical simulation of a measurement image of a scanning probe microscope may be performed to associate a measurement image with the atomic structure of a sample surface. To perform numerical simulation with the measurement image of a scanning probe microscope, two approaches have mainly been used.

One of the approaches is a bottom-up approach, in which the acting force is calculated at the atomic level and measurements are performed at a plurality of discrete probe scanning positions to form a coarse-grained simulation image. More specifically, this approach includes the steps described below:

Step 1: The probe tip atom is moved to a point (X, Y) within an xy plane.

Step 2: The probe tip atom is moved to point Z on the z axis, which is orthogonal to the xy plane. As a result, the probe tip atom will be at coordinates (X, Y, Z).

Figure 13:
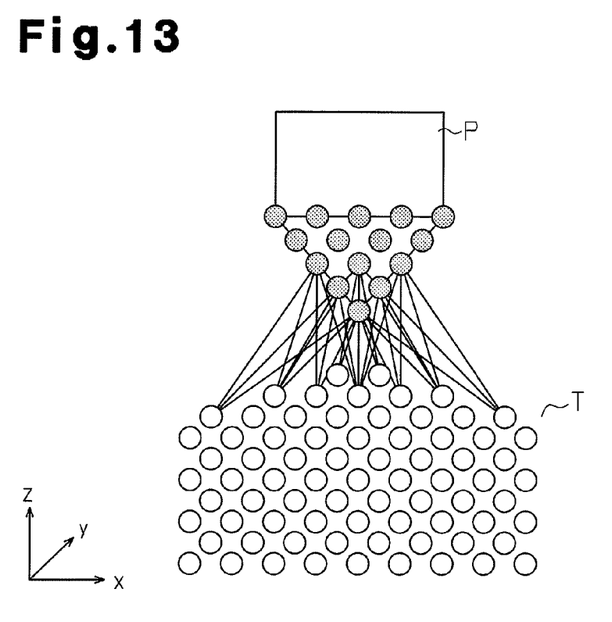
FIG. 13 is a diagram showing a simulation process of the prior art.

Step 3: Referring to FIG. 13, an acting force F between all probe atoms and sample atoms is calculated.

Figure 14A:
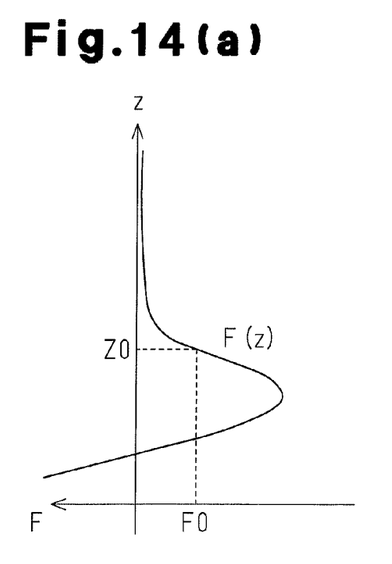
FIG. 14(a) is a graph showing the relationship between an interatomic force and distance and FIG. 14(b) is a graph showing the distribution of distance Z0 at which a predetermined force F0 is generated.

Step 4: The processing returns to step 2, in which the probe tip atom is moved to another point Z. Steps 2 and 3 are repeated to obtain a graph indicating the acting force (F(Z)) shown in FIG. 14(a).

Step 5: The height Z0 at which F(Z0) is equal to F0 for an acting force value F0 is determined.

Figure 14B:
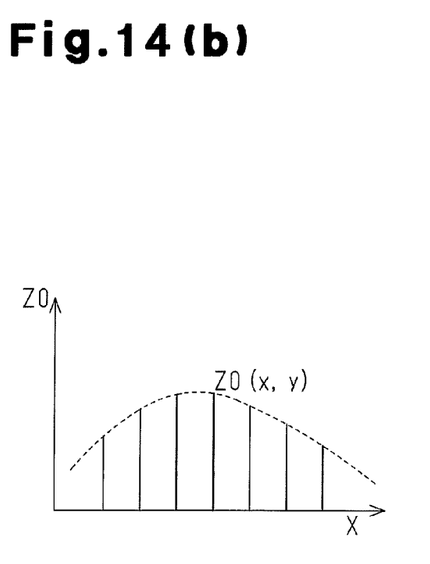

Step 6: As shown in FIG. 14(b), the processing returns to step 1, and steps 1 to 5 are repeated to obtain a two-dimensional distribution (Z0 (x, y)) of the height Z0.

The bottom-up approach described above has been successful when the subject is the surface of an inorganic solid.

The other one of the approaches is a top-down approach, in which a coarse-grained simulation image of a biomolecule and a probe is formed by assuming that the biomolecule and the probe are a continuum, and an interaction between the biomolecule and the probe is analyzed using the finite element method. This approach requires less time for calculations than the bottom-up approach.

Patent Document 1: Japanese Laid-Open Patent Publication No. 62-130302 (p. 1, FIG. 1)
Patent Document 2: Japanese Laid-Open Patent Publication No. 2004-279349 (p. 1, FIGS. 2 and 3)
Patent Document 3: Japanese Laid-Open Patent Publication No. 8-178935 (p. 1, FIGS. 1 to 3)

DISCLOSURE OF THE INVENTION

The bottom-up approach involves calculations for various values of the height Z to generate the acting force graph. However, such calculations for height values (Z) are unnecessary for $F(Z0) \neq F0$. In particular, the bottom-up approach would require an extremely long time to obtain a calculation result in the simulation of a sample with a large size, such as when the sample is a biomolecule.

With the top-down approach, it is difficult to consider individual characteristics of a biomolecule, such as the uneven shape of each biomolecule. As a result, the top-down approach fails to form a simulation image accurately corresponding to a biomolecule.

It is an object of the present invention to provide a simulation apparatus, a simulation method, and a simulation program for generating a simulation image at high speeds from a measurement result of a scanning probe microscope.

To solve the above problem, one aspect of the present invention provides a simulation apparatus for generating a simulation image from a measurement result of a scanning probe microscope. The apparatus includes an atomic arrangement storage unit which records atoms forming a sample model and arrangement coordinates of the atoms, a probe shape storage unit which records a probe model shape, and an arithmetic processing unit for calculating relative positions of the sample model and the probe model. The arithmetic processing unit divides the sample model using predetermined meshes and specifies a coordinate of a most projected position of the sample model in each mesh based on the arrangement coordinates of the atoms forming the sample model to obtain a representative value for each mesh, moves the probe model to near the sample model and specifies a nearest position of the probe model using the representative values of the sample model, and performs scanning with the probe model and generates a coarse-grained simulation image based on the nearest position of the probe model specified at each measurement position.

In one embodiment, the probe shape storage unit records atoms forming a probe model and arrangement coordinates of the atoms forming the probe model. The arithmetic processing unit divides the probe model using predetermined meshes and specifies a coordinate of a most projected position of the probe model in each mesh based on the arrangement coordinates of the atoms forming the probe model to obtain a representative value of the probe model for each mesh.

In one embodiment, the arithmetic processing unit obtains a measurement image actually measured by the scanning probe microscope and compares the measurement image and the coarse-grained simulation image to calculate an evaluation value for a degree of correspondence between the measurement image and the coarse-grained simulation image. The arithmetic processing unit further repeatedly rotates the sample model by a predetermined angle until the evaluation value becomes greater than or equal to a reference value to generate the coarse-grained simulation image.

In one embodiment, the arithmetic processing unit calculates, for each mesh of the sample model, a difference between nearest positions of adjacent meshes in the sample model, specifies atoms of the sample in a predetermined range around a mesh of which the calculated difference is less than or equal to a predetermined value and calculates a force acting between the atoms of the sample model and the atoms of the probe model to generate a microscopic image, and superimposes the microscopic image on the coarse-grained simulation image in the predetermined range to generate a composite image.

In one embodiment, the arithmetic processing unit calculates distance from the sample model to the probe model for each mesh based on a lowest position of the probe model in each mesh and a highest position of the sample model in each mesh that face each other.

In one embodiment, the arithmetic processing unit calculates distance between the probe model and an atom arranged at the highest position in each mesh of the sample model and does not calculate a distance between the probe model and an atom arranged at a position other than the highest position in each mesh of the sample model.

In one embodiment, the meshes for the probe model have a size that is the same as that of the meshes for the sample model.

In one embodiment, the meshes for the probe model have a size that differs from that of the meshes for the sample model.

In one embodiment, the meshes for the probe model have a variable size and the meshes for the sample model have a variable size.

Another aspect of the present invention is a simulation method for generating a simulation image from a measurement result of a scanning probe microscope with a computer. The method includes reading atoms forming a sample model and arrangement coordinates of the atoms forming the sample model from an atomic arrangement storage unit, dividing the sample model using predetermined meshes, and specifying a coordinate of a most projected position of the sample model in each mesh from the arrangement coordinates of the atoms forming the sample model to obtain a representative value for each mesh. Further, the method includes reading a shape of a probe model from a probe shape storage unit, moving the probe model to near the sample model, and specifying a nearest position of the probe model using the representative value of the sample model. The method also includes performing scanning with the probe model and generating a coarse-grained simulation image based on the nearest position of the probe model specified at each measurement position.

A further aspect of the present invention is a simulation program for generating a simulation image from a measurement result of a scanning probe microscope with a computer including an atomic arrangement storage unit recording atoms forming a sample model and arrangement coordinates of the atoms forming the sample model, a probe shape storage unit recording a shape of a probe model, and an arithmetic processing unit for calculating relative positions of the sample model and the probe model. The simulation program includes program code resulting in the arithmetic processing unit reading the atoms forming the sample model and the arrangement coordinates of the atoms forming the sample model from the atomic arrangement storage unit, dividing the sample model using predetermined meshes, and specifying a coordinate of a most projected position of the sample model in each mesh from the arrangement coordinates of the atoms forming the sample model to obtain a representative value for each mesh. Further, the program code results in the arithmetic processing unit reading a shape of a probe model from a probe shape storage unit, moving the probe model to near the sample model, and specifying a nearest position of the probe model using the representative value of the sample model. The program code also results in the arithmetic processing unit performing scanning with the probe model and generating a coarse-grained simulation image based on the nearest position of the probe model specified at each measurement position.

BRIEF DESCRIPTION OF THE DRAWINGS

FIGS. 14(a) and 14(b) are diagrams illustrating the simulation process of the prior art, in which

BEST MODE FOR CARRYING OUT THE INVENTION

A simulation apparatus according to a preferred embodiment of the present invention will now be described with reference to FIGS. 1 to 12. In the preferred embodiment, the simulation apparatus estimates the adsorption state of a protein molecule from a measurement result of an atomic force microscope and generates a three-dimensional image of the protein molecule. This process will be discussed. The simulation apparatus forms, in a virtual three-dimensional space, a probe model of the atomic force microscope and a sample model, which is formed based on the arrangement (configuration) of atoms of the protein molecule.

Figure 1:
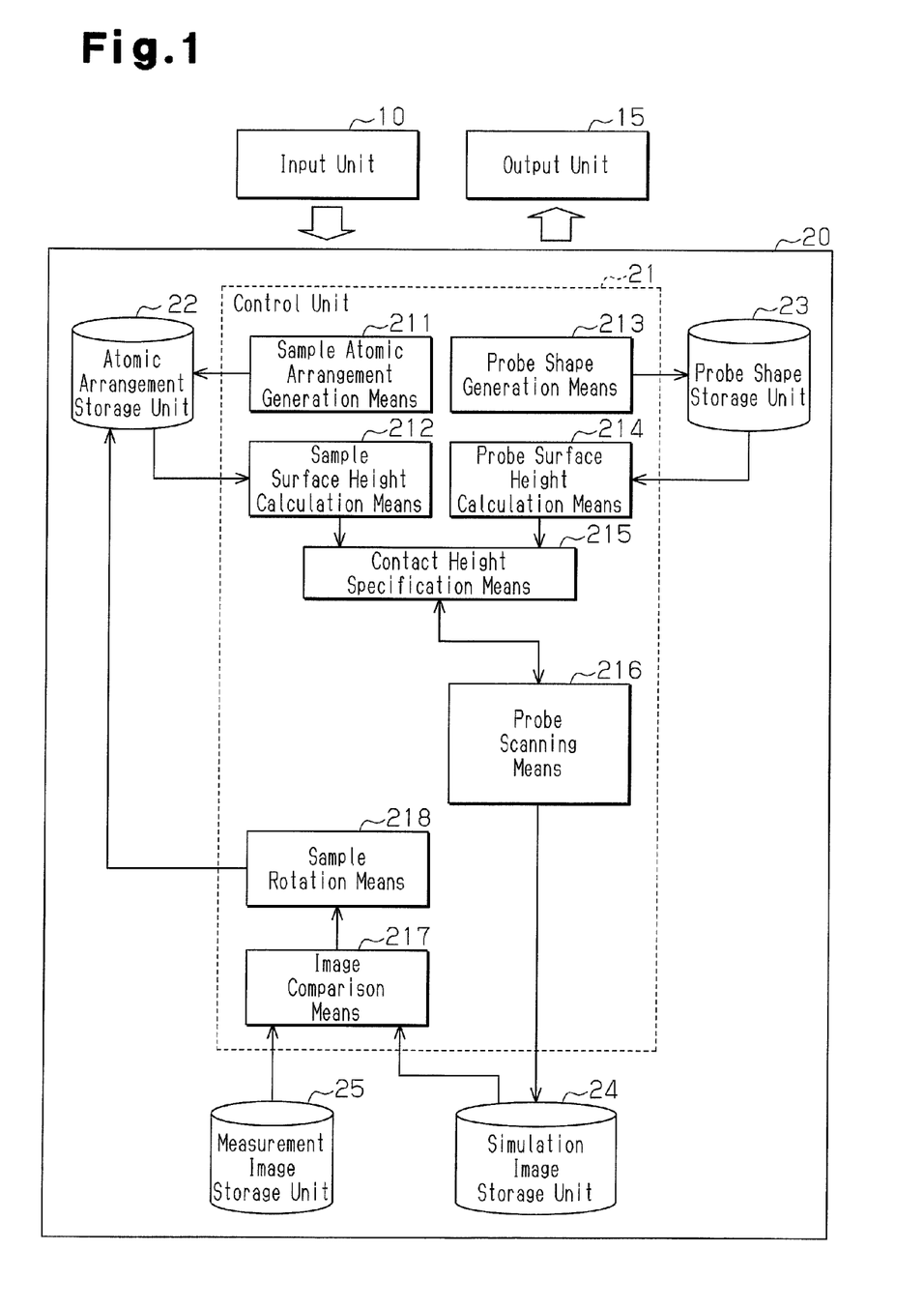
FIG. 1 is a block diagram of a simulation apparatus according to a preferred embodiment of the present invention.

As shown in FIG. 1, the simulation apparatus 20 of the preferred embodiment is connected to an input unit 10 and an output unit 15. The input unit 10 is used to input data and instructions into the simulation apparatus 20. The input unit 10 includes a keyboard, a pointing device, and a recording medium reader. The input unit 10 obtains data indicating the arrangement of protein atoms and the shape of the probe (three-dimensional model) and provides the data to the simulation apparatus 20. The input unit 10 may also obtain data indicating the arrangement of protein atoms from the protein data bank (PDB). The output unit 15 is used to output a calculation result of the simulation apparatus 20. The output unit 15 may be, for example, a display device for displaying three-dimensional graphics.

The simulation apparatus 20 is a computer including a control unit 21, which functions as an arithmetic processing unit, an atomic arrangement storage unit 22, a probe shape storage unit 23, a simulation image storage unit 24, and a measurement image storage unit 25. The control unit 21 may be, for example, a central processing unit (CPU). The atomic arrangement storage unit 22, the probe shape storage unit 23, the simulation image storage unit 24, and the measurement image storage unit 25 may be, for example, storage devices, such as a read-only memory (ROM), a random-access memory (RAM), and a hard disk drive.

The control unit 21 executes a simulation program including program codes for performing processes described later (a sample surface process, a probe arranging process, a scanning process, a probe surface process, an evaluation process, and an atomic arrangement changing process). The simulation program is stored in a computer-readable recording medium, which is one of a memory card, a flexible disk, an optical disc (CD-ROM, DVD-ROM, etc.), and a magneto-optical disk (MO, MD, etc.), and is provided to the simulation apparatus 20. The recording medium may be a medium or a disk device recording a program uploaded or downloaded via a communication medium or a storage unit of a server apparatus to which the simulation apparatus 20 is connected via a communication medium. The recording medium may record program codes that are directly executable by a computer, program codes that are converted to a format executable by a computer when installed in the computer, or program codes that are encrypted or compressed. The control unit 21 functions as a sample atomic arrangement generation means 211, a sample surface height calculation means 212, a probe shape generation means 213, a probe surface height calculation means 214, a contact height specification means 215, a probe scanning means 216, an image comparison means 217, and a sample rotation means 218.

The atomic arrangement storage unit 22 stores the coordinates of atoms forming a sample model of an evaluation subject sample. In the preferred embodiment, a protein molecule is used as a sample. The coordinates of atoms of the protein molecule (atomic arrangement data) may be generated based on, for example, the protein structure obtained from the protein data bank. The coordinates on the x, y, and z axes indicating atoms forming the sample model are used as the atomic arrangement data. The x axis and the y axis define a plane (horizontal plane) along which the probe performs scanning. The z axis is orthogonal to the xy plane, and a z axis coordinate is used to indicate the height of the probe. In this manner, the atomic arrangement of the sample model is defined by the position of the sample model relative to the position of the probe model. Thus, the value of the atomic arrangement of the sample model varies as the sample is rotated.

The probe shape storage unit 23 stores the coordinates of the atomic arrangement in the probe model. The coordinates of atoms forming the surface of the probe shape on the x, y, and z axes are used as the atomic arrangement data of the probe model.

The simulation image storage unit 24 stores a simulation image generated through a simulation image generation process. More specifically, the simulation image storage unit 24 stores a simulation image generated when the surface of the sample model stored in the atomic arrangement storage unit 22 is scanned using the probe model having the shape stored in the probe shape storage unit 23.

The measurement image storage unit 25 records a measurement image obtained by actual measurement performed with a scanning probe microscope.

The processing means (211 to 218) of the control unit 21 will now be described.

The sample atomic arrangement generation means 211 generates atomic arrangement data for the sample (for example, a protein molecule) model. More specifically, the sample atomic arrangement generation means 211 first sets a relative coordinate system for the atomic structure of the sample model and determines the coordinates of each atom of the sample model in the relative coordinate system. The sample atomic arrangement generation means 211 then arranges the sample model at a predetermined position in an absolute coordinate system including the surface of the known object and the probe arranged in a virtual three-dimensional space. The sample atomic arrangement generation means 211 then converts the coordinates of the sample model in the relative coordinate system to coordinates in the absolute coordinate system to generate atomic arrangement data and stores the atomic arrangement data into the atomic arrangement storage unit 22.

The sample surface height calculation means 212 functions as a sample surface processing unit. More specifically, the sample surface height calculation means 212 applies a grid including a plurality of meshes having a predetermined size arranged along the xy plane to the sample model and divides the sample model using the plurality of meshes. The sample surface height calculation means 212 then specifies an atom arranged at the highest position (most projected position in the z direction) in each mesh by referring to the atomic arrangement data stored in the atomic arrangement storage unit 22 and sets the height of the highest atom as the height of the corresponding mesh (representative value). The height of each mesh is used to indicate the height of the sample surface (value in the z direction in the preferred embodiment). The sample surface height calculation means 212 may pre-store the size of the meshes.

The probe shape generation means 213 generates atomic arrangement data for the probe model. More specifically, the probe shape generation means 213 obtains the shape of the probe model via the input unit 10, sets a relative coordinate system for the atomic structure of the probe model with the obtained shape, and determines the coordinates of each atom of the probe model in the relative coordinate system to generate atomic arrangement data including the coordinates of each atom of the probe model. The probe shape generation means 213 then registers the generated atomic arrangement data in the probe shape storage unit 23.

The probe surface height calculation means 214 applies a grid including a plurality of meshes having a predetermined size arranged along the xy plane to the probe model and divides the probe model using the plurality of meshes. The probe surface height calculation means 214 then specifies an atom arranged at the lowest position (most projected position in the z direction) in each mesh by referring to the atomic arrangement data stored in the probe shape storage unit 23 and sets the height of the lowest atom as the height of the corresponding mesh (representative value). The height of each mesh is used as the height of the probe surface (value in the z direction in the preferred embodiment). The probe surface height calculation means 214 may pre-store the size of the meshes. The size of the meshes for the probe may be set to be equal to the size of the meshes for the sample or set to differ from the size of the meshes for the sample.

The contact height specification means 215 functions as a probe arrangement unit. The contact height specification means 215 calculates, by simulation, the height of the probe (value in the z direction in the preferred embodiment) arranged at a position at which the sample surface and the probe surface come in contact with each other. In the preferred embodiment, the contact height specification means 215 first arranges the probe model at each measurement position (x and y coordinates) specified by the probe scanning means 216. The contact height specification means 215 then moves the probe model in the z direction to arrange the probe model near the sample model. The contact height specification means 215 calculates the absolute coordinate (value in the z direction) of the probe arranged at a position at which the probe surface calculated by the probe surface height calculation means 214 comes in contact with the sample surface calculated by the sample surface height calculation means 212 in any of the meshes. In this case, the position of the mesh in which the sample surface and the probe surface come in contact with each other differs depending on the state of the sample surface and the shape of the probe.

The probe scanning means 216 functions as a scanning unit. The probe scanning means 216 scans the probe model within an area including the sample model and obtains the contact height at each measurement position from the contact height specification means 215. More specifically, the probe scanning means 216 determines a scanning range of the probe model based on the atomic arrangement data of the sample model stored in the atomic arrangement storage unit 22. The probe scanning means 216 performs scanning with the probe model in the scanning range and provides each measurement position (x and y coordinates) for which the contact height has been obtained to the contact height specification means 215. The probe scanning means 216 further stores the contact height for each measurement position obtained from the contact height specification means 215 in the simulation image storage unit 24 in a manner that each contact height is associated with the corresponding measurement position.

The image comparison means 217 functions as an evaluation unit. The image comparison means 217 compares the simulation image stored in the simulation image storage unit 24 and the measurement image stored in the measurement image storage unit 25. In the preferred embodiment, the image comparison means 217 equalizes the entire scale of the simulation image and the measurement image, performs fitting of the sample shapes in the two images, and calculates the degree of correspondence between the images based on a difference between the sample shapes of the two images. When the degree of correspondence is less than or equal to a reference value held in the image comparison means 217, the image comparison means 217 provides the comparison result to the sample rotation means 218.

The sample rotation means 218 functions as an atomic arrangement changing unit. The sample rotation means 218 determines the rotation angle of the sample based on the comparison result obtained from the image comparison means 217. The sample rotation means 218 then changes the atom coordinates stored in the atomic arrangement storage unit 22 in accordance with the rotation angle and registers the changed coordinates again in the atomic arrangement storage unit 22 as updated atomic arrangement data.

A process for estimating the adsorption state of a protein molecule that is performed by the simulation apparatus 20 will now be described with reference to FIGS. 2 and 3.

The atomic structure of the sample model (a protein molecule in this example) and the atomic structure of the probe model are first input using the input unit 10. In the preferred embodiment, the atomic structure of the evaluation subject protein molecule is assumed to be obtained from the protein data bank. The atomic structure of the probe model is a crystal structure cut into a predetermined shape.

Figure 2:
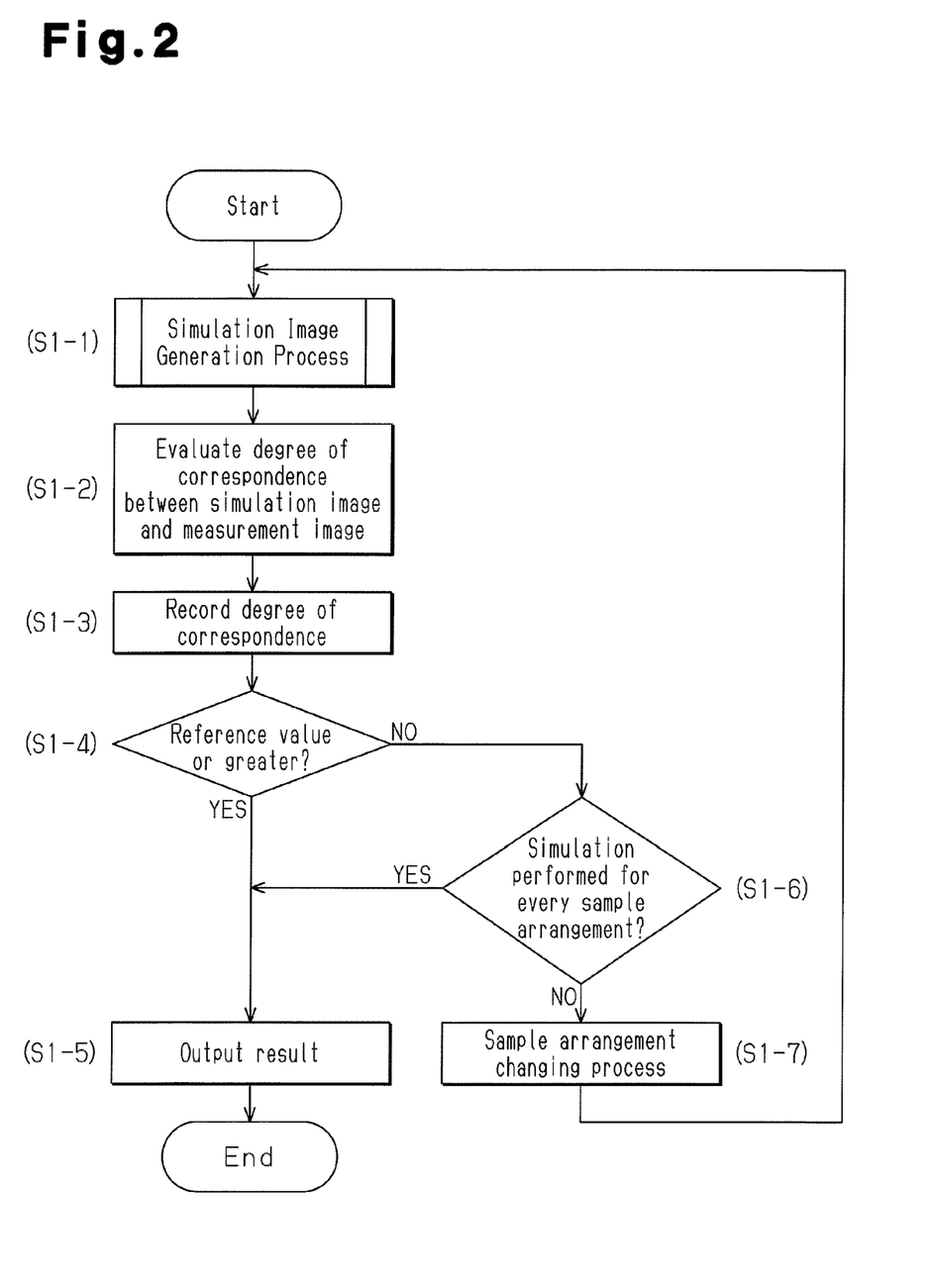
FIG. 2 is a flowchart of a simulation.

As shown in FIG. 2, the control unit 21 performs a simulation image generation process (step S1-1). The simulation image generation process will now be described with reference to FIG. 3.

In the simulation image generation process, the control unit 21 first generates atomic arrangement data of the sample model (step S2-1). More specifically, the sample atomic arrangement generation means 211 determines the coordinates of each atom in the evaluation subject protein molecule and generates atomic arrangement data formed by the coordinates of each atom that is adsorbed on the surface of a known object. The sample atomic arrangement generation means 211 then records the generated atomic arrangement data to the atomic arrangement storage unit 22.

Figures 4A, 4B, 4C:
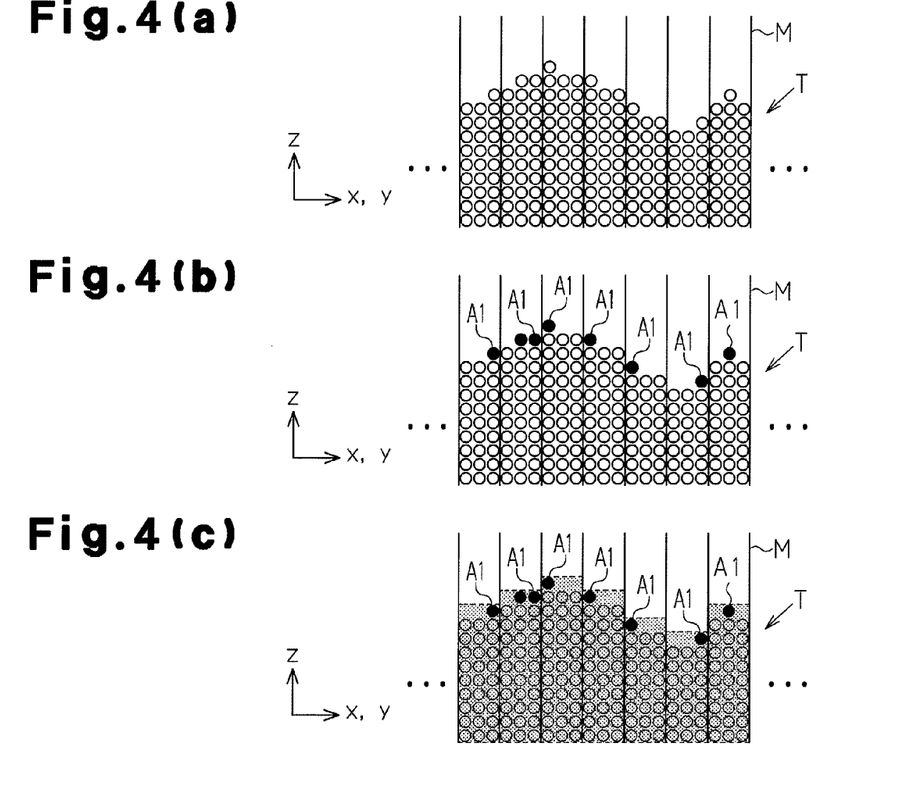
FIGS. 4(a), 4(b), and 4(c) are schematic diagrams illustrating calculations of the height of a sample surface.

Subsequently, the control unit 21 calculates the sample surface height for each mesh (step S2-2). More specifically, the sample surface height calculation means 212 divides the scanning range including the sample model on the xy plane using the meshes having a prestored size (refer to FIG. 6). FIG. 4(a) shows an example in which a sample T, which is an evaluation subject, is divided using meshes M. Each mesh M includes a plurality of atoms with different z coordinates.

As shown in FIG. 4(b), the sample surface height calculation means 212 specifies an atom A1 that is arranged at the most projected position (highest position in this case) in each mesh and obtains the height (z coordinate) of each atom A1.

The sample surface height calculation means 212 then sets the height of each atom A1 as the height of the sample surface in the corresponding mesh as shown in FIG. 4(c). The two-dimensional displays shown in FIGS. 4(a) to 4(c) are converted into a three-dimensional display shown in FIG. 6.

The control unit 21 generates atomic arrangement data of the probe model (step S2-3). More specifically, the probe shape generation means 213 determines the coordinates of each atom forming the probe (atomic arrangement data) based on the shape data of the probe model obtained through the input unit 10. The probe shape generation means 213 then records the determined atomic arrangement data to the probe shape storage unit 23.

The control unit 21 then calculates the height of the probe surface on the xy plane in each mesh (step S2-4). More specifically, the probe surface height calculation means 214 applies a grid including a plurality of meshes having a prestored size arranged along the xy plane to the probe. Then, the probe surface height calculation means 214 divides the probe using the plurality of meshes. The probe surface height calculation means 214 obtains the height (z coordinate) of an atom arranged at the most projected position (lowest position in this case) in each mesh. The probe surface height calculation means 214 specifies the height of the atom at the lowest position in each mesh as the height of the probe surface in each mesh.

Figure 3:
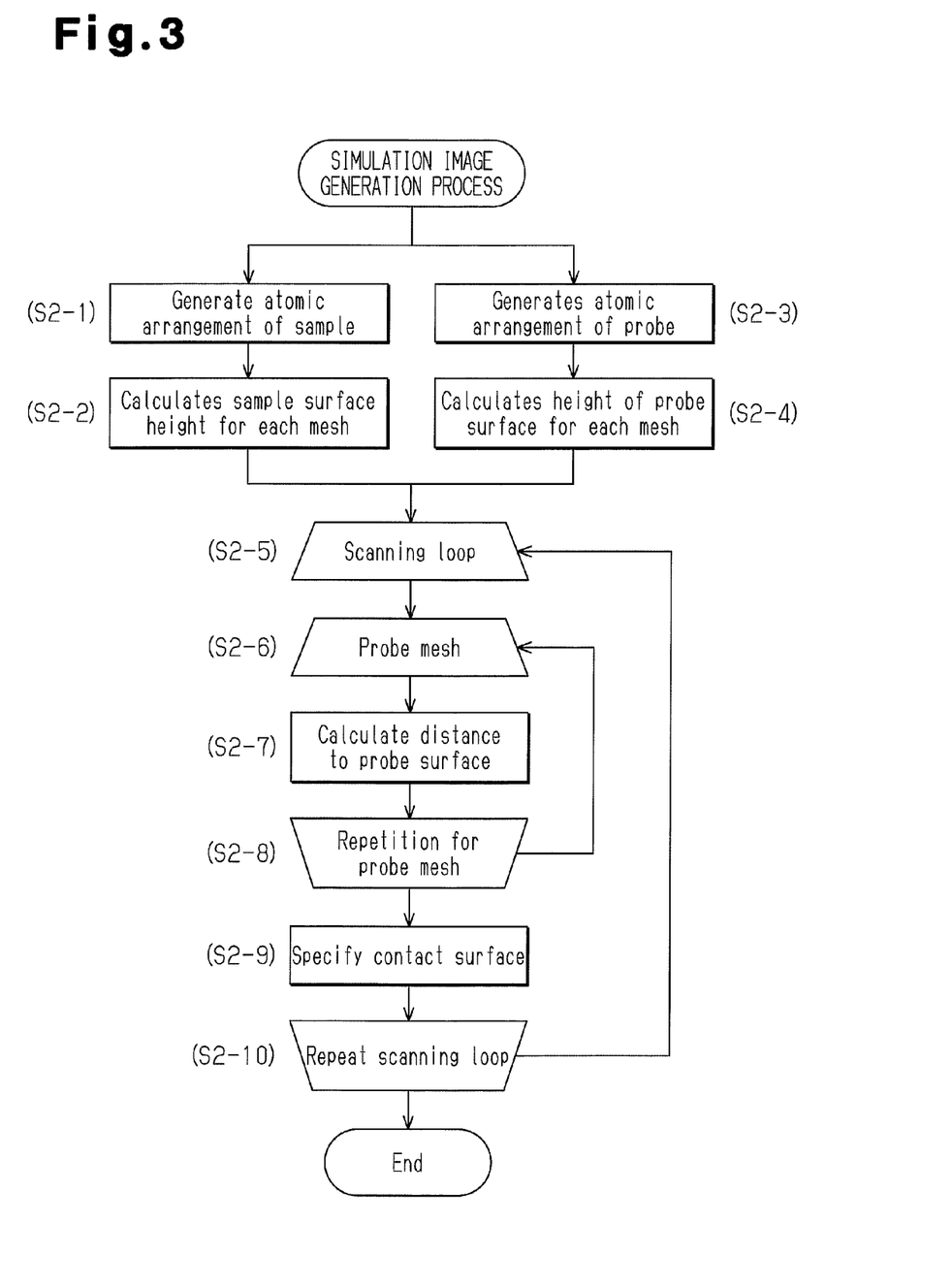
FIG. 3 is a flowchart of a simulation image generation process.

Steps S2-3 and S2-4 may be performed in parallel with steps S2-1 and S2-2 as shown in FIG. 3 or may be performed before or after steps S2-1 and S2-2.

After calculating the height of the sample surface and the height of the probe surface, the control unit 21 calculates the contact height (described later) in the scanning range of the probe (steps S2-5 to S2-10). First, the probe scanning means 216 determines the scanning initiation position (x and y coordinates) in the scanning range and provides the coordinates of the scanning initiation position to the contact height specification means 215 as the coordinates of a measurement position.

Figure 5:
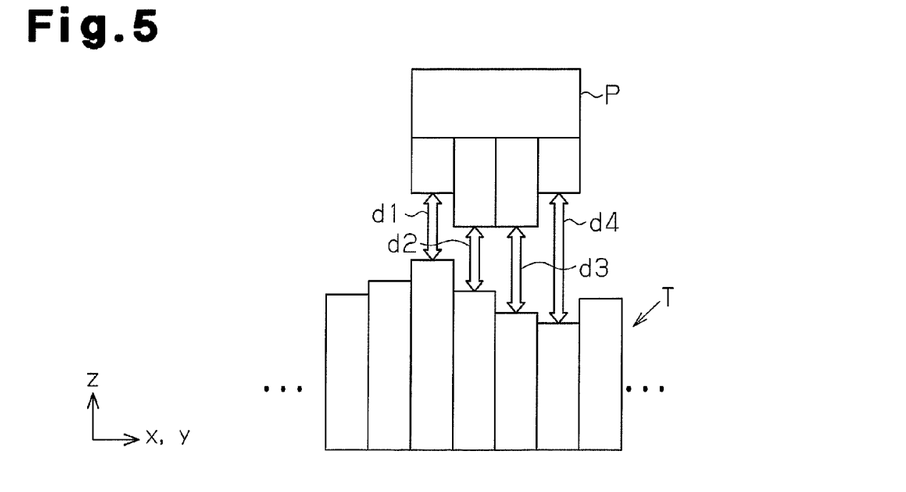
FIG. 5 is a schematic diagram illustrating calculations of a distance between a probe and a sample to obtain a contact height.
Figure 6:
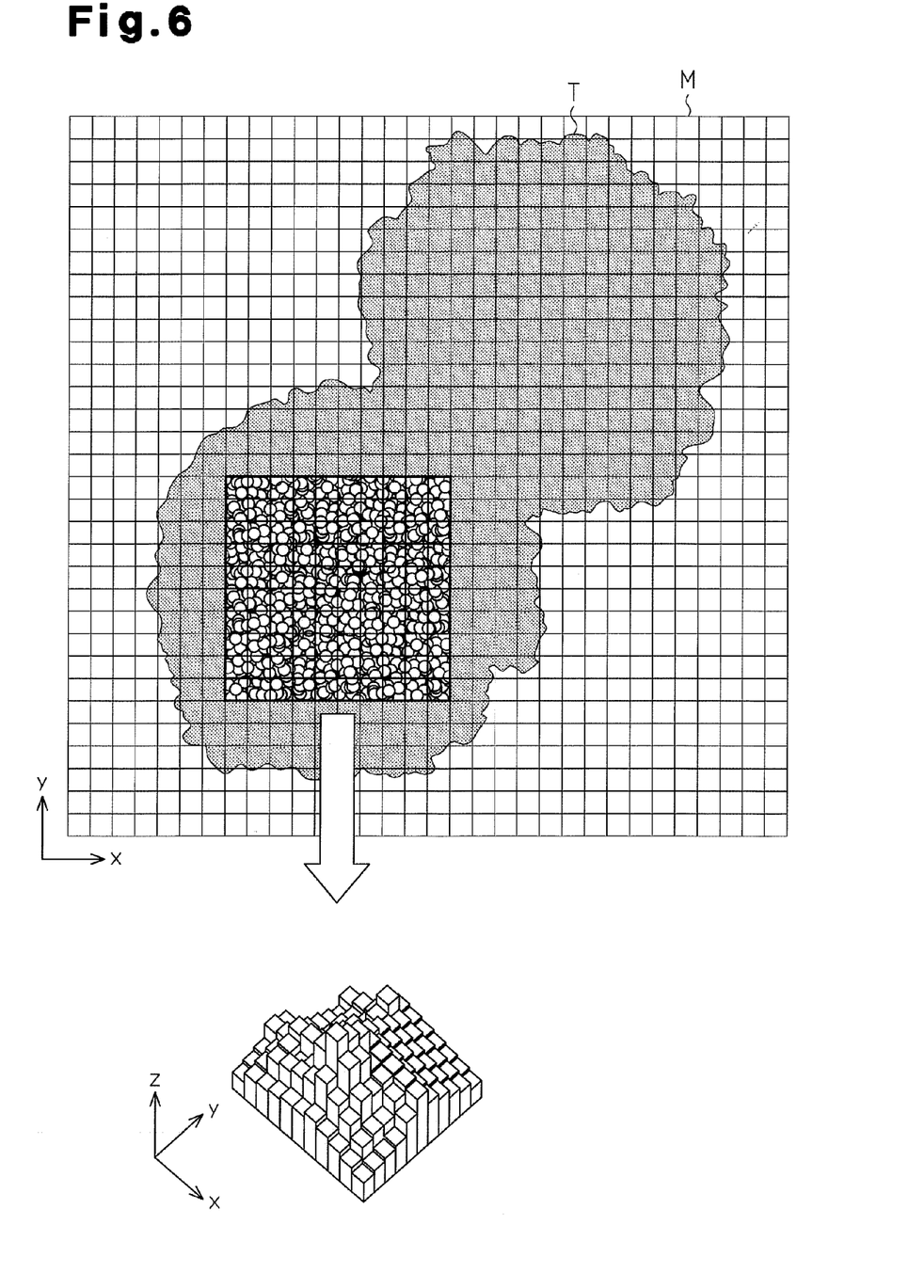
FIG. 6 is a schematic diagram illustrating a sample divided using meshes and a simulation image.
Figure 7:
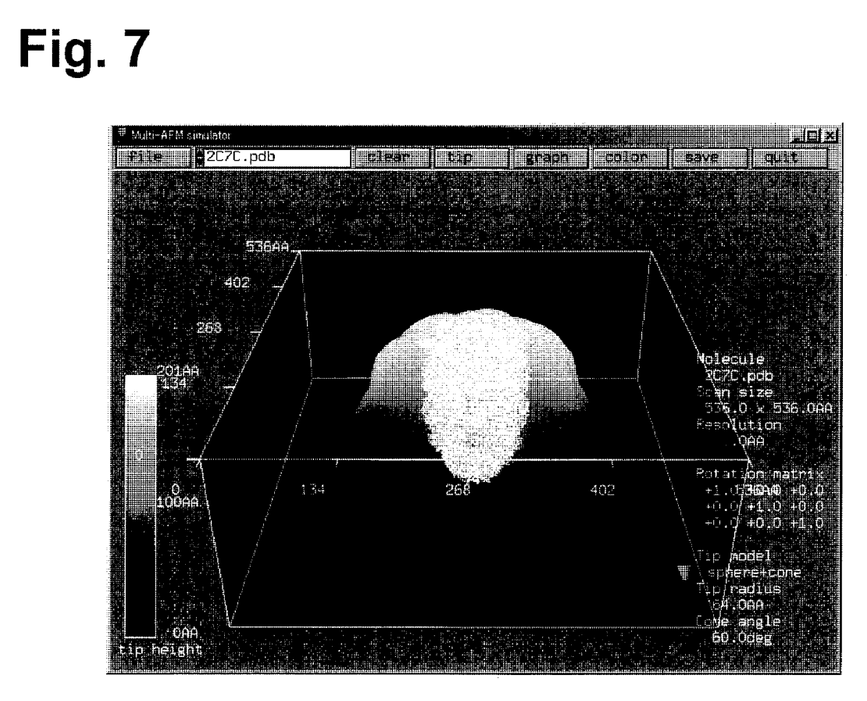
FIG. 7 shows an example of a display of a three-dimensional simulation image.
Figure 8:
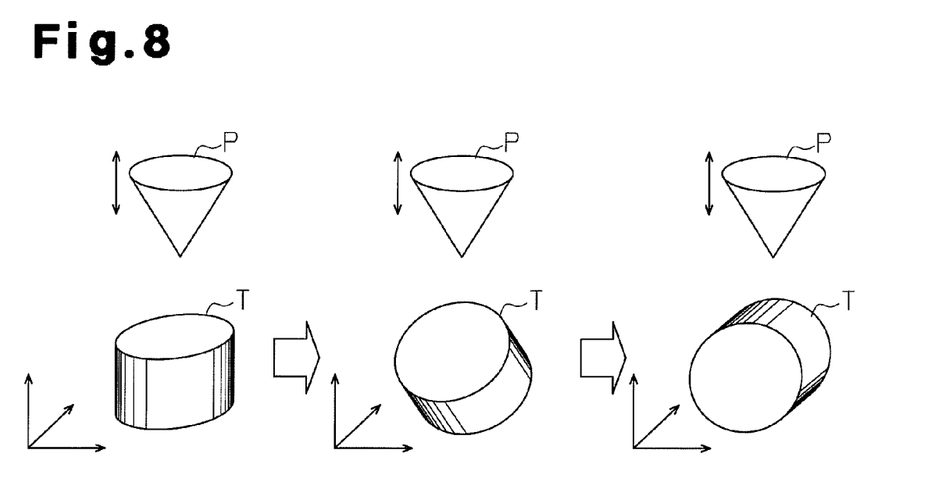
FIG. 8 is a diagram illustrating the operation for rotating a sample.
Figure 9:
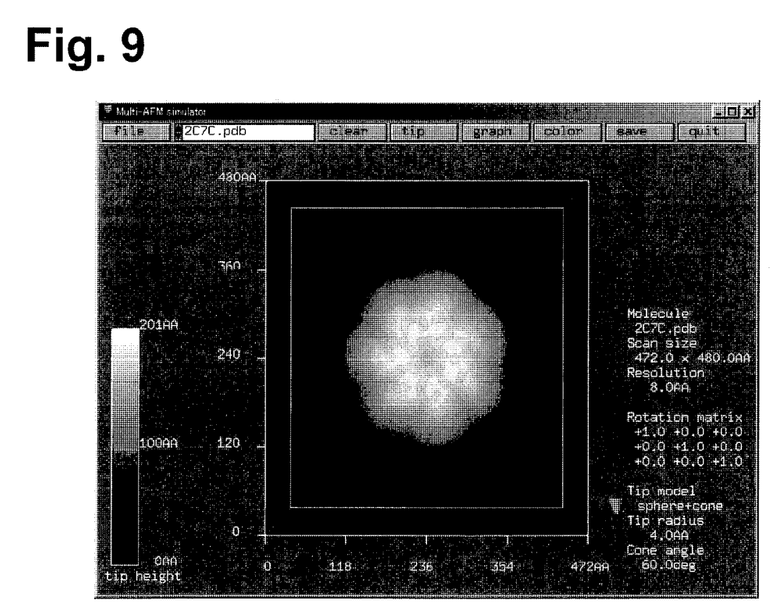
FIG. 9 shows an example of a display of a two-dimensional simulation image.
Figure 10:
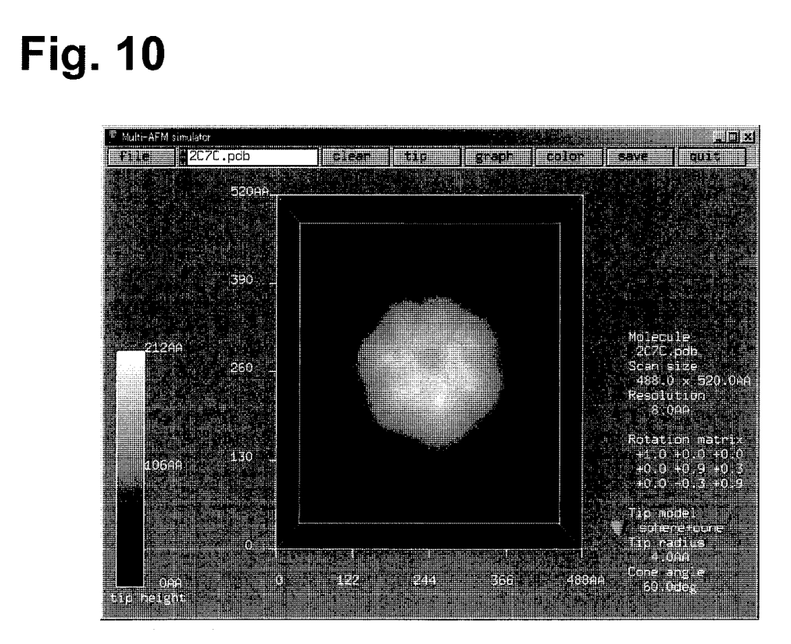
FIG. 10 shows an example of a display of a two-dimensional simulation image.
Figure 11:
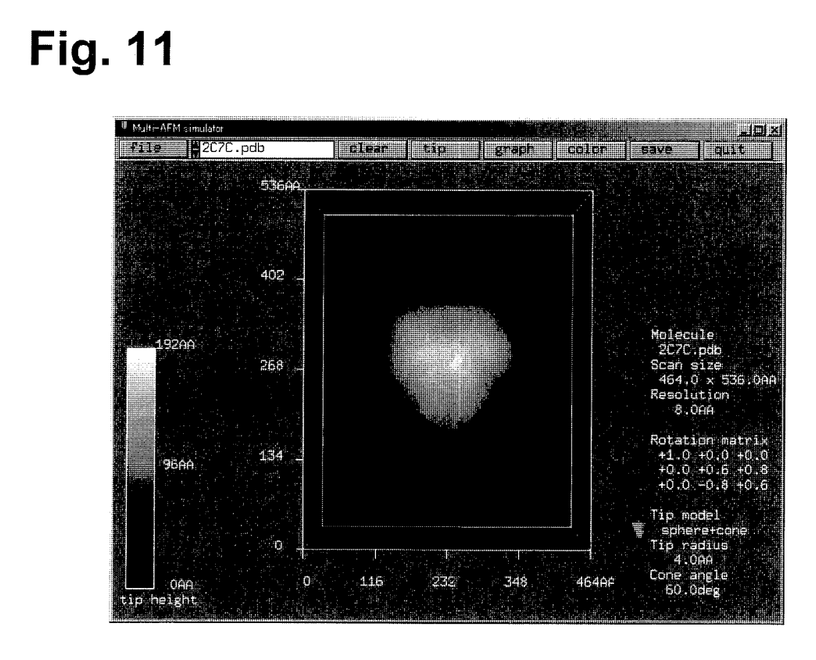
FIG. 11 shows an example of a display of a two-dimensional simulation image.
Figure 12:
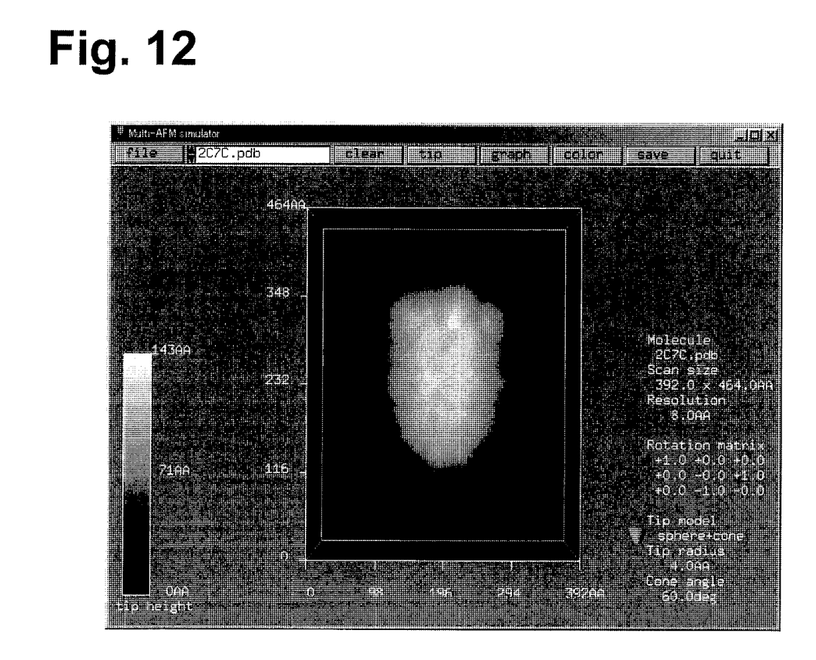
FIG. 12 shows an example of a display of a two-dimensional simulation image.

In this case, the control unit 21 calculates the distance between the sample surface and the probe based on the height of the sample surface and the height of the probe in each mesh of the probe (steps S2-6 to S2-8). More specifically, the contact height specification means 215 arranges the probe model at the measurement position coordinates, which are provided from the probe scanning means 216. The contact height specification means 215 then specifies the mesh of the sample model facing the probe model arranged at the measurement position coordinates. The contact height specification means 215 then calculates the distance between the sample surface and the probe surface in the z direction in each mesh based on the lowest position of the probe model in each mesh and the highest position of the sample model in each mesh facing thereto (step S2-7). The distance calculation is repeated for every one of the meshes for the probe at the measurement position coordinates (step S2-8). As a result, distances d1, d2, d3, d4, . . . between the probe P and the sample T are calculated as shown in FIG. 5.

The control unit 21 then specifies the contact height based on the calculated distances (step S2-9). More specifically, the contact height specification means 215 specifies the mesh in which the distance between the probe surface and the sample surface is the shortest based on the lowest position of the probe model in each mesh and the highest position of the sample model in each mesh facing thereto. The contact height specification means 215 then calculates, as the contact height, the height (z coordinate) of the probe arranged at a position at which the probe model first comes in contact with the sample model when the probe model is moved in the z direction to arrange the probe model near the sample model. In FIG. 5, the distance d2 is the shortest. The z coordinate of the probe arranged at a position at which the distance d2 becomes 0 is the contact height. The contact height specification means 215 then provides the contact height to the probe scanning means 216. The probe scanning means 216 records the contact height (z coordinate) to the simulation image storage unit 24 in a manner that the contact height is associated with the corresponding measurement position coordinates (x and y coordinates).

The probe scanning means 216 repeats the processing in steps S2-5 to S2-9 until the contact height for every one of the measurement position coordinates in the scanning range is calculated (step S2-10). This completes the simulation image generation process.

As shown in FIG. 2, the control unit 21 evaluates the degree of correspondence between the simulation image and the measurement image (step S1-2). More specifically, the image comparison means 217 obtains the measurement image, which is an actually measured image, from the measurement image storage unit 25 and obtains the simulation image from the simulation image storage unit 24. The image comparison means 217 then performs fitting on the simulation image and the measurement image while rotating the simulation image in the xy plane. When the rotation angle of the simulation image in the xy plane is a variable, the image comparison means 217 calculates the inverse of a minimum difference in the fitting as the degree of correspondence (evaluation value).

The control unit 21 then records the calculated degree of correspondence (step S1-3). More specifically, the image comparison means 217 stores the degree of correspondence in association with the corresponding rotation angle (initial value is 0).

The image comparison means 217 compares the calculated degree of correspondence with a reference value (step S1-4). The image comparison means 217 prestores the reference value.

When the degree of correspondence is greater than or equal to the reference value (YES in step S1-4), the control unit 21 outputs the result (step S1-5). More specifically, the image comparison means 217 develops the simulation image stored in the simulation image storage unit 24 into a three-dimensional space and displays the three-dimensional image with the output unit 15 (refer to FIG. 7). A central portion of the display screen shows the molecular structure of the protein molecule (structure registered as "2C7C" in the protein data bank). The simulation image is a stereoimage having contour lines surrounding the molecular structure. FIGS. 9 to 12 each show two-dimensional simulation images of the protein molecule as observed from above in a state rotated at different angles.

When the degree of correspondence is less than the reference value (NO in step S1-4), the control unit 21 determines whether simulation has been performed for every one of the sample arrangements (step S1-6). In the preferred embodiment, the sample rotation means 218 generates sample arrangements by rotating the sample about a predetermined axis parallel to the xy plane in the manner shown in FIG. 8. The sample rotation means 218 rotates the sample in accordance with a predetermined rotation angle list stored in the sample rotation means 218. The sample rotation means 218 deletes the rotation angle for which simulation has been performed and the degree of correspondence has been calculated. When simulation is completed for every one of the sample arrangements (YES in step S1-6), the control unit 21 specifies a simulation image determined to have the smallest degree of correspondence and outputs the specified simulation image (step S1-5).

When there still are sample arrangements that have not undergone simulation (NO in step S1-6), the control unit 21 performs a sample arrangement changing process (step S1-7). More specifically, the sample rotation means 218 rotates the sample about the adsorption surface at a rotation angle recorded in the rotation angle list. The sample rotation means 218 then generates atomic arrangement data for the rotated sample and records the generated atomic arrangement data to the atomic arrangement storage unit 22. In this manner, the processing in step S1-1 and subsequent steps is repeated.

The preferred embodiment has the advantages described below.

In the preferred embodiment, the sample surface height calculation means 212 divides the sample model using the plurality of meshes, specifies the height of an atom arranged at the highest position (most projected position in the z direction) in each mesh by referring to the atomic arrangement data of the sample stored in the atomic arrangement storage unit 22, and sets the height of the highest atom as the height of the corresponding mesh. In this manner, information representative of the surface of the sample model is used for calculation.

This reduces the calculation load.

The probe surface height calculation means 214 divides the probe mode using the plurality of meshes, specifies the height of an atom arranged at the lowest position (most projected position in the z direction) in each mesh by referring to the atomic arrangement data stored in the probe shape storage unit 23, and sets the height of the lowest atom as the height of the corresponding mesh. In this manner, information representative of the surface of the probe model is used for calculation. This reduces the calculation load.

The contact height specification means 215 then simulates the height of the probe arranged at a position at which the sample surface and the probe surface come in contact with each other (value in the z direction in the preferred embodiment). In the preferred embodiment, the contact height specification means 215 first arranges the probe model at each measurement position (x and y coordinates) specified by the probe scanning means 216. The contact height specification means 215 then moves the probe model in the z direction to arrange the probe model near the sample model and calculates the absolute coordinate (value in the z direction) of the probe model arranged at a position at which the probe surface calculated by the probe surface height calculation means 214 comes in contact with the sample surface calculated by the sample surface height calculation means 212 in any of the meshes. This enables scanning results for the probe model to be estimated based on the geometric positional relationship. More specifically, the simulation apparatus of the present invention measures the force acting between the sample and the probe based on pseudo shapes without actually measuring the force acting between the sample and the probe. The simulation apparatus of the present invention requires only several seconds to calculate a simulation result of a sample formed by tens of thousands of atoms, whereas the bottom-up technique of the prior art would require several days to obtain such a simulation result. The simulation apparatus of the present invention therefore shortens the time required for simulation.

In the preferred embodiment, the image comparison means 217 compares the simulation image data stored in the simulation image storage unit 24 and the measurement image data stored in the measurement image storage unit 25. In the preferred embodiment, the image comparison means 217 equalizes the entire scale of the simulation image and the measurement image and performs fitting on the sample shapes in the two images and calculates the degree of correspondence between the images based on a difference between the sample shapes of the two images. When a molecule or the like is adsorbed on the surface of a known object, a measurement image obtained using a scanning probe microscope differs depending on the adsorption state. A simulation image taking into consideration the adsorption state is generated and compared with a measurement image. This enables determination as to whether the assumed adsorption state is correct.

When the degree of correspondence is less than the reference value held in the image comparison means 217, the image comparison means 217 provides the comparison result to the sample rotation means 218. The sample rotation means 218 then determines the rotation angle of the sample based on the comparison result obtained from the image comparison means 217. The sample rotation means 218 changes the atomic arrangement stored in the atomic arrangement storage unit 22 based on the rotation angle and registers the coordinates of the atomic arrangement in the atomic arrangement storage unit 22 as atomic arrangement data. This enables the adsorption state of the sample to be detected.

The preferred embodiment may be modified in the following forms.

The sample surface height calculation means 212 may change the sample surface height for each mesh in accordance with the type of atom arranged at the most projected position (highest position) in each mesh of the sample. For example, a distance correction table in which bias distances depending on Van der Waals forces are set for different atom types may be prepared. The sample surface height calculation means 212 may specify the type of atom arranged at the most projected position and add a bias distance, which is specified using the distance correction table, to the coordinates of the atom to calculate the sample height. This enables calculation of the sample surface height taking into consideration Van der Waals forces, which differ depending on the type of an atom.

The probe surface height calculated by the probe surface height calculation means 214 is not limited to the height of the most projected position in each mesh of the probe and may be any value representing the geometric shape of the probe. For example, the tip of the probe may be assumed to have a semispherical surface with a predetermined curvature radius, and the contact height of the semispherical surface that comes in contact with the sample surface may be calculated.

The size of the meshes for the sample is not limited to the fixed value prestored in the sample surface height calculation means 212 and may be variable. For example, the sample surface height calculation means 212 may store a mesh size determination table including sizes of the sample model and sizes of the corresponding meshes. The sample surface height calculation means 212 may specify a sample size based on the atomic arrangement of the sample and determine a mesh size by referring to the mesh size determination table. This enables determination of an appropriate mesh size in accordance with a sample size.

The size of the meshes for the sample model may be changed depending on the properties of the probe model (for example, the sharpness of the probe tip). In this case, the sample surface height calculation means 212 may store a mesh size determination table including the properties of the probe model and sizes of the corresponding meshes. When a probe used for the simulation is selected, the sample surface height calculation means 212 may obtain the properties of the probe model and determine a mesh size by referring to the mesh size determination table. The measurement result of a scanning probe microscope is affected greatly by the size of the probe. The use of the mesh size determination table enables the generation of a simulation image taking into consideration the probe size.

For every one of the scanning areas, an image generated by another simulation method (microscopic image) may be superimposed on a simulation image generated through the processing of steps S2-5 to S2-10. For example, a coarse-grained simulation image may be generated through the processing in steps S2-5 to S2-10 described above. Then, the control unit 21 may specify a characteristic image area from the coarse-grained simulation image. To specify the characteristic image area, the difference between the nearest positions of adjacent meshes is calculated. An area having a difference that is less than or equal to a predetermined value is used as the characteristic image area. The control unit 21 specifies an area of the sample model for which the characteristic image area has been generated and performs simulation with the area using another simulation method. In this case, for example, atoms forming the sample model in a predetermined range around each mesh may be specified, and simulation may be performed by calculating the acting force.

The control unit 21 may generate a microscopic image by such simulation. The control unit 21 then superimposes the generated microscopic image on the characteristic image area of the coarse-grained simulation image. This generates in a short time a coarse-grained simulation image with which the entire image can be determined easily and enables the generation of an accurate microscopic image of a selected area (for example, an area with large changes).

In the preferred embodiment, the adsorption state of a protein molecule, which serves as a sample with an unknown adsorption state, is estimated. For a sample of which adsorption state is known, the simulation apparatus of the present invention may use a result of comparison between a simulation image and a measurement image to evaluate the shape of a probe. The simulation image differs depending on the size of meshes used to divide the probe or the sample. Thus, when the state (shape) of the sample is known, fitting of the simulation image and the measurement image is performed to determine the size of meshes with which fitting can be easily performed. When the probe is assumed to have a semispherical tip, fitting may be performed by varying the curvature radius of the probe tip to specify the probe shape.

In the preferred embodiment, a simulation image for a single sample arrangement is generated (step S1-1), and the degree of correspondence between the simulation image and a measurement image is evaluated (step S1-2). When the degree of correspondence is less than the reference value and simulation has not been performed for every one of the sample arrangements (NO in step S1-6), the control unit 21 performs the sample arrangement changing process (step S1-7). The method for evaluating the degree of correspondence between the simulation image and the measurement image is not limited to such a method, and a plurality of simulation images may be compared with the measurement image. In this case, a plurality of simulation images with different sample arrangements are first generated. More specifically, the control unit 21 prestores a plurality of relatively large rotation angles for a rough evaluation and a plurality of relatively small rotation angles for a detailed evaluation. The rotation angles for rough evaluation are used for rough rotation movements, and the rotation angles for detailed evaluation are used for fine adjustments. The control unit 21 then generates a plurality of simulation images by arranging the sample at the different rotation angles for rough evaluation stored in the control unit 21 (step S1-1). Further, the control unit 21 evaluates the degree of correspondence between each of the generated plurality of simulation images with the measurement image (step S1-2). Based on each evaluation result, the control unit 21 specifies a rotation angle for rough evaluation with the highest degree of correspondence. The control unit 21 then calculates a plurality of rotation angles by adding each of the rotation angles for detailed evaluation to the specified rotation angle for rough evaluation. The control unit 21 then generates a plurality of simulation images by arranging the sample at the calculated rotation angles (step S1-1). The control unit 21 evaluates the degree of correspondence between each of the generated simulation images with the measurement image and specifies a simulation image with the highest degree of correspondence to the measurement image. In this manner, the simulation apparatus efficiently specifies a simulation image with a high degree of correspondence to the measurement image. Accordingly, the adsorption state of a protein molecule is efficiently detected.

The invention claimed is:

1. A simulation apparatus for generating a coarse-grained simulation image of a sample to be measured with a probe of a scanning probe microscope, the apparatus comprising:

an atomic arrangement storage unit which records atoms forming a sample model corresponding to the sample and arrangement coordinates of the atoms forming the sample model;

a probe shape storage unit which records a shape of a probe model corresponding to the probe; and an arithmetic processing unit for calculating relative positions of the sample model and the probe model;

wherein the arithmetic processing unit:

divides the sample model using predetermined meshes and specifies a coordinate of a most projected position of the sample model in each mesh based on the arrangement coordinates of the atoms forming the sample model to obtain a representative value for each mesh;

moves the probe model to the sample model and calculates a contact position of the probe model at which the probe model first comes in contact with the sample model in any of the meshes in a virtual three-dimensional space using the representative values of the sample model, without calculating an acting force between the atoms forming the sample model and the atoms forming the probe model; and performs scanning with the probe model to calculate contact positions of the probe model at a plurality of measurement positions on the sample model and generates the coarse-grained simulation image of the sample model based on the contact positions of the probe model calculated at the plurality of measurement positions, without performing an actual scanning of the sample with the probe of the scanning probe microscope.

2. The simulation apparatus according to claim 1, wherein:

the probe shape storage unit records atoms forming the probe model and arrangement coordinates of the atoms forming the probe model; and the arithmetic processing unit divides the probe model using predetermined meshes and specifies a coordinate of a most projected position of the probe model in each mesh based on the arrangement coordinates of the atoms forming the probe model to obtain a representative value of the probe model for each mesh.

3. The simulation apparatus according to claim 2, wherein the arithmetic processing unit calculates distance from the sample model to the probe model for each mesh based on a lowest position of the probe model in each mesh and a highest position of the sample model in each mesh that face each other.

4. The simulation apparatus according to claim 3, wherein the arithmetic processing unit calculates distance between the probe model and an atom arranged at the highest position in each mesh of the sample model and does not calculate a distance between the probe model and an atom arranged at a position other than the highest position in each mesh of the sample model.

5. The simulation apparatus according to claim 3, wherein the meshes for the probe model have a size that is the same as that of the meshes for the sample model.

6. The simulation apparatus according to claim 3, wherein the meshes for the probe model have a size that differs from that of the meshes for the sample model.

7. The simulation apparatus according to claim 3, wherein the meshes for the probe model have a variable size and the meshes for the sample model have a variable size.

8. The simulation apparatus according to claim 1, wherein the arithmetic processing unit:
  obtains a measurement image actually measured by the scanning probe microscope and compares the measurement image and the coarse-grained simulation image to calculate an evaluation value for a degree of correspondence between the measurement image and the coarse-grained simulation image; and
  repeatedly rotates the sample model by a predetermined angle until the evaluation value becomes greater than or equal to a reference value to generate the coarse-grained simulation image.

9. The simulation apparatus according to claim 1, wherein the arithmetic processing unit:
  calculates, for each mesh of the sample model, a difference between the contact positions of adjacent meshes in the sample model;
  specifies atoms of the sample model in a predetermined range around a mesh of which the calculated difference is less than or equal to a predetermined value and calculates a force acting between the atoms of the sample model and the atoms of the probe model to generate a microscopic image; and
  superimposes the microscopic image on the coarse-grained simulation image in the predetermined range to generate a composite image.

10. A simulation method for generating a coarse-grained simulation image of a sample to be measured with a probe of a scanning probe microscope with a computer, the method comprising:
  reading atoms forming a sample model corresponding to the sample and arrangement coordinates of the atoms forming the sample model from an atomic arrangement storage unit, dividing the sample model using predetermined meshes, and specifying a coordinate of a most projected position of the sample model in each mesh from the arrangement coordinates of the atoms forming the sample model to obtaining a representative value for each mesh;
  reading a shape of a probe model corresponding to the probe from a probe shape storage unit, moving the probe model to the sample model, and calculating a contact position of the probe model at which the probe model first comes in contact with the sample model in any of the meshes in a virtual three-dimensional space using the representative value of the sample model, without calculating an acting force between the atoms forming the sample model and the atoms forming the probe model; and
  performing scanning with the probe model to calculate contact positions of the probe model at a plurality of measurement positions on the sample model and generating the coarse-grained simulation image based on the contact positions of the probe model calculated at the plurality of measurement positions, without performing an actual scanning of the sample with the probe of the scanning probe microscope.

11. A computer-readable recording medium storing a simulation program for generating a coarse-grained simulation image of a sample to be measured with a probe of a scanning probe microscope with a computer including an atomic arrangement storage unit recording atoms forming a sample model corresponding to the sample and arrangement coordinates of the atoms forming the sample model, a probe shape storage unit recording a shape of a probe model corresponding to the probe, and an arithmetic processing unit for calculating relative positions of the sample model and the probe model, the simulation program comprising program code resulting in the arithmetic processing unit:
  reading the atoms forming the sample model and the arrangement coordinates of the atoms forming the sample model from the atomic arrangement storage unit, dividing the sample model using predetermined meshes, and specifying a coordinate of a most projected position of the sample model in each mesh from the arrangement coordinates of the atoms forming the sample model to obtain a representative value for each mesh;
  reading a shape of a probe model from a probe shape storage unit, moving the probe model to the sample model, and calculating a contact position of the probe model at which the probe model first comes in contact with the sample model in any of the meshes in a virtual three-dimensional space using the representative value of the sample model, without calculating an acting force between the atoms forming the sample model and the atoms forming the probe model; and
  performing scanning with the probe model to calculate contact positions of the probe model at a plurality of measurement positions on the sample model and generating the coarse-grained simulation image of the sample model based on the contact positions of the probe model calculated at the plurality of measurement positions, without performing an actual scanning of the sample with the probe of the scanning probe microscope.

* * * * *